(12) United States Patent
Chang et al.

(10) Patent No.: US 12,114,388 B2
(45) Date of Patent: Oct. 8, 2024

(54) RESUME FAILURE REPORT FOR FAILED ATTEMPT TO RESUME CONNECTED STATE FROM INACTIVE STATE

(71) Applicants: Kyocera Corporation, Kyoto (JP); Henry Chang, San Diego, CA (US); Masato Fujishiro, Yokohama (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 264 days.

(21) Appl. No.: 17/435,618

(22) PCT Filed: Mar. 25, 2020

(86) PCT No.: PCT/US2020/024557
§ 371 (c)(1),
(2) Date: Sep. 1, 2021

(87) PCT Pub. No.: WO2020/198272
PCT Pub. Date: Oct. 1, 2020

(65) Prior Publication Data
US 2022/0159552 A1 May 19, 2022

Related U.S. Application Data

(60) Provisional application No. 62/825,617, filed on Mar. 28, 2019.

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0016* (2013.01); *H04W 36/00835* (2018.08); *H04W 48/06* (2013.01); *H04W 76/18* (2018.02)

(58) Field of Classification Search
CPC ............. H04W 76/27; H04W 36/0016; H04W 36/00835; H04W 48/06; H04W 76/18;
(Continued)

(56) References Cited

U.S. PATENT DOCUMENTS 9,609,682 B2 * 3/2017 Chang .................. H04W 24/04
11,564,277 B2 * 1/2023 Kim ...................... H04W 76/19
(Continued)

FOREIGN PATENT DOCUMENTS

JP 2015146646 A * 8/2015 ........... H04L 41/069
JP 6385322 B2 * 9/2018
(Continued)

OTHER PUBLICATIONS

5G; NR; Radio Resource Contrl RRC, Protocol Specification; (3GPP TS 38.331 Version 15.2.0 Release 15) (Year: 2018).*
(Continued)

*Primary Examiner* — Ayaz R Sheikh
*Assistant Examiner* — Louis Samara (57) ABSTRACT

A mobile wireless communication user equipment device (mobile device) logs unsuccessful attempts to resume to the connected (e.g., RRC_CONNECTED) state from the inactive (e.g., RRC_INACTIVE) state. The mobile device maintains the resume failure log that includes the events and parameters related to the failed attempt to resume to the active state, reports the resume failure log availability, and provides the resume failure log when requested by a base station.

18 Claims, 5 Drawing Sheets

(51) Int. Cl.
*H04W 48/06* (2009.01)
*H04W 76/18* (2018.01)

(58) Field of Classification Search
CPC ..... H04W 24/10; H04W 76/19; H04W 24/08; H04W 76/30; H04W 68/005; H04L 43/0847
See application file for complete search history.

(56) References Cited

U.S. PATENT DOCUMENTS

| | | | | |
|---|---|---|---|---|
| 11,889,467 | B2 * | 1/2024 | Hwang | ............... H04W 68/005 |
| 2013/0070632 | A1 | 3/2013 | Jung et al. | |
| 2015/0103770 | A1 * | 4/2015 | Chang | ................... H04W 24/10 |
| | | | | 370/329 |
| 2015/0281991 | A1 * | 10/2015 | Jung | ..................... H04W 76/18 |
| | | | | 370/329 |
| 2016/0112893 | A1 * | 4/2016 | Jung | ..................... H04W 24/10 |
| | | | | 370/252 |
| 2018/0220320 | A1 * | 8/2018 | Koskinen | .............. H04W 76/27 |
| 2018/0220486 | A1 | 8/2018 | Yung-Lan et al. | |
| 2019/0021128 | A1 | 1/2019 | Sivavakeesar | |
| 2019/0037629 | A1 | 1/2019 | Ryu et al. | |
| 2019/0387568 | A1 * | 12/2019 | Teyeb | ................... H04W 76/30 |
| 2020/0037285 | A1 * | 1/2020 | Sivavakeesar | ........ H04W 76/27 |
| 2020/0120740 | A1 * | 4/2020 | Kim | ..................... H04L 43/0847 |
| 2022/0086688 | A1 * | 3/2022 | Jin | ....................... H04W 76/30 |
| 2022/0132619 | A1 * | 4/2022 | Tsuboi | .................. H04W 76/27 |
| 2022/0312540 | A1 * | 9/2022 | da Silva | ................ H04W 76/19 |

FOREIGN PATENT DOCUMENTS

| | | | | |
|---|---|---|---|---|
| JP | | 2019537358 A | * | 12/2019 |
| WO | WO-2018128529 A1 | * | 7/2018 | ............ H04W 12/72 |
| WO | WO-2018214708 A1 | * | 11/2018 | ............ H04W 68/02 |

OTHER PUBLICATIONS

Ericsson; "Handling of resume failure," R2-1802593; 3GPP TSG-RAN WG2 #101; Feb. 15, 2018; Athens, GR.

* cited by examiner

| DIRECTED IDLE 302 | AUTO. IDLE 304 | GEO. LOCATION 306 | QOS LIMIT 308 | CAPACITY 310 | TARGET BS ID 312 | LAST SERVING BS ID 314 | RESUME ID 316 |
|---|---|---|---|---|---|---|---|

| MDT DATA (INACTIVE AND/OR IDLE) 320 | INACTIVE DURATION 322 | STATE CHANGE 324 | RESELECTED CELL CRITERIA 326 | SERVICE TYPE 328 |
|---|---|---|---|---|

RESUME FAILURE REPORT FOR FAILED ATTEMPT TO RESUME CONNECTED STATE FROM INACTIVE STATE

CLAIM OF PRIORITY

The present application claims priority to Provisional Application No. 62/825,617, entitled "Logged MDT In Inactive State", filed Mar. 28, 2019, assigned to the assignee hereof, and hereby expressly incorporated by reference in its entirety.

FIELD

This invention generally relates to wireless communications and more particularly to minimization drive tests (MDT) for an inactive state.

BACKGROUND

Wireless communication systems operating in accordance with various standards employ minimization drive tests (MDT) to improve wireless communication coverage. When new base stations are deployed, drive tests are performed before and after service activation of the new cell (base station). Initially, downlink/uplink (DL/UL) coverage measurements of the new cell and neighbor cells are made in the intended area of coverage improvement. During this phase, initial area tuning is performed (e.g. selection of an appropriate antenna for the new cell, adjustment of antenna tilting of the new cell and neighbor cells, etc.). Service with the new cell will be started after such initial tuning. Drive tests are performed to collect more extensive data of DL/UL coverage measurements in the intended area to confirm that adequate DL/UL coverage is being provided. In order to reduce the rigorous drive tests that are needed to collect downlink/uplink coverage measurements Minimization of Drive Test (MDT) are used to gather data. Using an MDT procedure, measurements can be collected from user equipments (UEs) (mobile devices) without the need for the extensive drive tests. As a result, the MDT can reduce network maintenance costs for operators, ensure a faster optimization cycle resulting in higher customer satisfaction and help to reduce the carbon emission to protect the environment. Furthermore, MDT enables operators to collect measurements from areas which are not accessible for drive tests (e.g. narrow roads, forests, private land/house/office). Other uses of MDT include mobility, capacity, QoS optimizations. In order to collect measurements from the mobile communication device, the device must be configured with the MDT parameters. The MDT configuration parameters typically include indicators of what parameters to measure, the time stamp of the log, how long the measurement should last and what parameters to report. For some standards defined by the 3rd Generation Partnership Project (3GPP), the Radio Resource Control (RRC) include RRC_CONNECTED and RRC_IDLE. The standards for 5G or New Radio (NR) define a new state for the UE device of inactive (RRC_INACTIVE). RRC_INACTIVE is a state where the UE device remains in a connected management connected state (CM-CONNECTED) and can move within an area configured by the New Generation (NG)-Radio Access Network (RAN) RAN-based Notification Area (RNA) without notifying the NG-RAN. The RRC_INACTIVE state, therefore, is a new RRC state in NR that is in addition to RRC_IDLE and RRC_CONNECTED. Connection Management (CM) is used to establish and release the control plane signaling connection between the UE device and the Access Management Function (AMF). The Connection Management depicts UE device status with respect to the device signaling with AMF 5G Core Node. Connection Management is used to transfer NAS signaling messages. Signaling Connection between the UE device and the AMF is based on the Uu interface sometimes known as a N1 logical interface and it is a combination of 1) RRC signaling between the UE and the gNB and 2) N2-AP signaling between the gNB and the AMF. The 3GPP has defined two Connection Management State for the UE device and AMF including Connection Management-Idle (CM-IDLE) and Connection Management-Connected (CM-CONNECTED). The CM-IDLE and CM-CONNECTED states are maintained at the NAS layer at both the UE device and the AMF. When the UE device is in the RRC_INACTIVE state, therefore, it is still in the CM_CONNECTED state. In RRC_INACTIVE, the last serving gNB node keeps the UE context and the UE-associated NG connection with the serving Access and Mobility Management Function (AMF) and the User Plan Function (UPF). A UE device in the RRC_INACTIVE state is required to initiate the RNA update procedure when it moves out of the configured RNA. When receiving an RNA update request from the UE device, the receiving gNB triggers the XnAP Retrieve UE Context procedure to get the UE context from the last serving gNB and may decide to send the UE device back to RRC_INACTIVE state, move the UE device into RRC_CONNECTED state, or send the UE device to RRC_IDLE.

SUMMARY

A mobile wireless communication user equipment device (mobile device) logs unsuccessful attempts to resume to the connected (e.g., RRC_CONNECTED) state from the inactive (e.g., RRC_INACTIVE) state. The mobile device maintains the resume failure log that includes the events and parameters related to the failed attempt to resume to the active state, reports the resume failure log availability, and provides the resume failure log when requested by a base station.

DETAILED DESCRIPTION

As discussed above, recent changes to communication standards include the addition of an inactive state where the mobile device is in the CM_CONNECTED state and is allowed to move between cells without notifying the network. The mobile device is connected to the AMF of the network in the inactive state but is not capable of transmitting or receiving user data between the mobile device and the network. In the connected state, the mobile device is capable of transmitting and receiving user data between the mobile device and the network. After entering the inactive state, the mobile device may reselect a different base station (gNB) to "camp on". In other words, the mobile device may reselect a new gNB from which to receive signaling. In order to resume to the connected (RRC_CONNECTED) state, the mobile device sends a resume request (RRC_Resume Request) to the gNB (target gNB). Where the resume procedure is successful, the target base station (gNB) retrieves the mobile device information (UE context) from the last serving base station (gNB) and facilitates the transition of the mobile device to the RRC_CONNECTED state. In some situations, however, the resume request is denied or otherwise fails. The cause for the failure may result from the inability of the target gNB to retrieve the UE context from the last serving gNB. This may be due to the last gNB not being able to identify the UE context by means of the UE Context ID, or if the integrity protection contained in the RETRIEVE UE CONTEXT REQUEST message is not valid, or, if it decides not to provide the UE context to the new NG-RAN node. Other examples for resume attempt failures include radio link failures, the inability of the target gNB to provide the QoS for the requested service needs, and unavailable capacity at the target gNB (e.g., target gNB is overloaded). As a result, the last gNB will respond to the target gNB with the RETRIEVE UE CONTEXT FAILURE message. And in turn the target gNB will deny establishment of the UE to the connected state by sending a release to idle message instructing the mobile device to enter the idle state. In the idle state, the mobile device is no longer in CM-CONNECTED and cannot exchange user data with the network. In some situations, the mobile device autonomously transitions from inactive to idle states in response to not receiving any response from the target gNB. This may occur because the resume request message is not successfully received at the target gNB or because a message transmitted by the gNB to the mobile device is not successfully received.

In accordance with the examples discussed herein, the mobile device maintains a resume failure log including at least one parameter, event and/or circumstance related to a failed resume attempt after the mobile device has been in the inactive state. For one example, the mobile device at least logs whether a Release to IDLE message was received from the gNB. The mobile device may also log whether a radio link failure occurred during the resume attempt. Other parameters that may be logged include the cell ID of the target gNB to which the resume request message was sent, the geographical location of the mobile device, and the duration of time that the mobile device had been in the inactive state before sending the resume request.

The configured Logged MDT is extended to the inactive state where the report provides information regarding the change of states. With conventional systems, a configured Logged MDT configures the mobile device to periodically record the signal strength of the serving cell and neighbor cells, location, and time stamp during the idle state. For the examples herein, the mobile device logs these parameters in the inactive state in the same MDT log for the idle state and includes and indication of when the mobile device changed states. By providing an indication of when the mobile device transitioned from inactive to idle, the MDT logged report assists the network in determining what problem(s) may have occurred. The MDT logged report also indicates whether the reselected serving cell is really the best cell or a sub-optimal cell (i.e., not based on the strongest signal strength).

Figure 1:
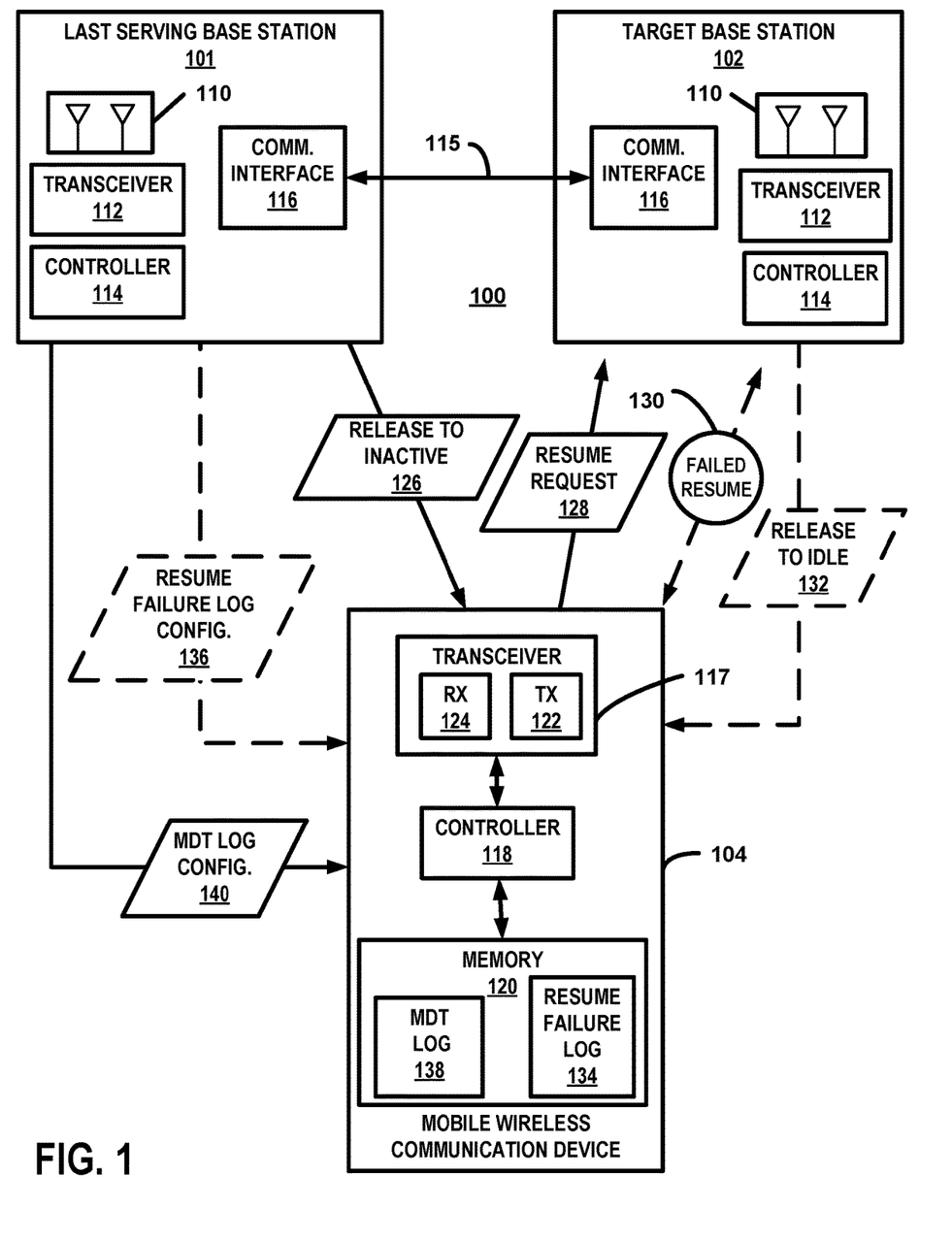
FIG. 1 is a block diagram of a communication system including two base stations and a mobile wireless communication device (mobile device) in the inactive state.

FIG. 1 is a block diagram of a communication system 100 including base stations 101, 102 and mobile wireless communication devices 104. The base stations 101, 102 transmit and receive control and data signals to and from user equipment mobile wireless communication devices (UE devices) (mobile devices) 104 and may be referred to as eNodeBs, eNBs, gNBs, transceiver stations, access points, and other terms depending on the particular type of system. For the example of FIG. 1, one base station 101 is the last serving base station 101 to the mobile device 104 before the mobile device 104 entered the inactive state. Another base station 102 is a target base station 102 to which the mobile device 104 attempts to resume active communication (i.e., resume RCC_CONNECTED). Each base station 101, 102 includes at least an antenna system 110, a transceiver 112, and a controller 114. Although the antenna system 110 may only include a single antenna, the antenna system 110 may include multiple elements or antennas and is typically controllable such that the antenna radiation and reception patterns can be adjusted. The transceiver 112 includes electronics for transmitting downlink signals and receiving uplink signals through the antenna system 110. The controller 114 is any combination of electronics, processors, and/or processor arrangements that runs code to perform base station functions described herein as well as facilitate the overall operation of the base station. The base stations are in communication with each other through a backhaul 115. An example of a suitable communication technique includes using X2 or Xn messaging. Accordingly, the base stations also include communication interface equipment 116 for communicating with other base stations. For the examples discussed herein, the base stations operate in accordance with 3rd Generation Partnership Project (3GPP) 5G specification, such as New Radio (NR), standards and protocols.

The MDT logging procedure and resume failure logging procedure are discussed with reference to a single mobile wireless communication device (mobile device) 104 for the examples herein although multiple devices may perform the MDT and resume-failure logging procedures for a particular coverage region. The mobile wireless communication devices (mobile devices) 104 include devices such as wireless telephone devices, sometimes referred to as handsets or cell phones, as well as other devices such as wireless personal digital assistants (PDAs), laptop computers, tablets and wireless modems. The mobile devices are sometimes referred to as user equipment (UE) and UE devices.

Each mobile wireless communication device (mobile device) 104 includes at least a transceiver 117, a controller 118, and memory 120. A transmitter 122 and receiver 124 of the transceiver 117 include electronics for transmitting and receiving signals, respectively. The transmitter 122 and receiver 124 may include any combination of hardware, software, and/or firmware. In most circumstances, the mobile wireless communication devices 104 also include input and output devices such as, for example, visual displays, keyboards, touch screens, microphones and speakers (not shown).

As discussed above, the MDT procedure provides a means for collecting data that can be used to optimize system performance. As is known, antennas 110 and other equipment at one or more base stations 106, 108 are adjusted based on the data provided by mobile wireless communication devices 104 and acquired during the MDT procedure. The information regarding the quality of received signals provided by the mobile wireless communication devices 104 is used to improve communication coverage in the desired areas. Adjustments may be made to multiple base stations 101, 102 to reduce interference and increase signal power within the desired regions. For example, the antenna of a serving base station providing the communication service may be adjusted to increase signal strength in a service area of the base station and the antenna of a nearby interfering base station (not shown) may be adjusted to reduce signal from the interfering base station in the service area of the serving base station.

For the examples herein, the mobile device enters the inactive state while connected to a serving base station (101). The last serving base station 101 sends a message, such a release to RRC_INACTIVE message 126, to the mobile device which places the mobile device 104 in inactive. The mobile device 104 attempts to return to the connected state while in the inactive state by sending a message to a base station 102. For the example of FIG. 1, the mobile device 104 sends a resume request message 128 to the target base station 102. While in the inactive state, the mobile device may camp on a different cell of a different base station. In other words, the mobile device receives some signals and messaging from another base station while in the inactive state. Such a situation may occur, for example, where the mobile device has moved to new geographical location. Therefore, although a resume request may be sent to the last serving base station in some situations, the message is sent to a target base station different from the last serving base station in the example of FIG. 1.

In some situations, as discussed above, the resume attempt by the mobile device fails. As discussed herein, a resume failure is any event where the attempt to return to the connected state is not successful. For the example of FIG. 1, the resume attempt fails where the resume failure 130 is represented by the circle and dashed arrow labeled with reference number 130. In some situations, the resume failure 130 may be realized when a Release to IDLE message 132 is received from the target base station. The Release to IDLE message is illustrated with dashed lines in FIG. 1 to indicate that the resume failure 130 may result without the transmission and receipt of the Release to IDLE message 132. For example, the resume failure 130 may occur because the resume request is not properly received at the target base station 102, in which case the mobile device 104 autonomously transitions to idle. In another example, the Connect message transmitted by the target base station 102 is not properly received by the mobile device 104, in which case the mobile device autonomously transitions to idle.

The mobile device 104 maintains a resume failure log 134 that includes information related to the resume failure. For the examples herein, the information in the resume failure log includes at least an indication of whether a Release to IDLE message was received. In some situations, the log 134 may include an indication whether the mobile device autonomously entered the idle state. Such an indication may be either in addition to, or alternatively to, the Release to IDLE message receipt indication. The log 134 may also include information related to any combination of the location of the mobile device, the duration of time that the mobile device was in inactive, and when a Release to IDLE message was received.

In some examples, the resume failure log 134 may include other reasons that the resume attempt failed. In such examples, the target base station can provide information related to the determination to send the mobile device to idle in response to the resume connect message. Such information may include an indication that the mobile device information (e.g., UE context) could not be retrieved from the last serving base station. The cause for the failure, therefore, may result from the inability of the target gNB to retrieve the UE context from the last serving gNB. This may be due to the last gNB not being able to identify the UE context by means of the UE Context ID, or if the integrity protection contained in the RETRIEVE UE CONTEXT REQUEST message is not valid, or, if it decides not to provide the UE context to the new NG-RAN node. Other information may be related to the inability of the target base station to provide the requested QoS of the service the mobile device requires. The target base station may also inform the mobile device that the release to idle was due to a capacity of the target base station or an overload condition. Therefore, the target base station may provide any combination of information related to the cause of the release to IDLE message including information indicative of a failure to identify the UE context by the UE Context ID, an invalidity of the integrity protection in the RETRIEVE UE CONTEXT REQUEST message, a decision not to provide the UE context to the new NG-RAN node, an overload or capacity reason, or an inability to provide the required QoS. The information related to the Release to IDLE determination may be sent as part of the Release to IDLE messaging in some circumstances. In other circumstances, the information can be sent in separate messaging.

The resume failure log may be dynamically configured by the network or may be specified. For example, a base station may send a resume failure log configuration message 136 that configures the mobile device for the resume failure log 134. Such a technique is similar to the convention MDT logging. If the resume failure is specified, the mobile device is preconfigured or hardcoded to the perform the resume failure logging. For example, conventional radio-link failure (RLF) reports not need to be configured to activate the failure report logging since it specified by a standard that the mobile device will log the failure event when it occurs. Therefore, for the situation where the communication standard specifies the resume failure log and the mobile device supports the feature without additional configuration, the mobile device logs and reports the resume failure if one is detected. For the example of FIG. 1, the resume failure log configuration is illustrated in dashed lines to indicate that in some situations the resume failure log is specified or the mobile device is otherwise preconfigured to perform the logging procedure and resume failure log configuration is not sent.

In addition to the resume failure log 134, the mobile device also maintains a configured MDT log 138. The configured Logged MDT is in accordance with known techniques where the mobile device periodically records the signal strength of the serving cell and neighbor cells, the location of the mobile device, and a time stamp in idle. For the examples herein, the MDT logging procedure is also performed in the inactive state. In one example, a single log is maintained for both states and the mobile device includes information in the log identifying the state corresponding to the logged information. For example, by indicating when the mobile device transitions from inactive to idle, the logged report assists the network in deciphering what problem(s) may have occurred. For the example, the configured MDT log also indicates whether the reselected serving cell (new target cell) is the "best" cell with the strongest signal strength or a sub-optimal cell where the selected cell does not have the strongest signal strength. Therefore, for the examples herein, a base station such as the last serving base station 101, sends an MDT log configuration message 140 to configure the MDT logging. When the mobile device 104 transitions to the connected state, for the examples herein, the mobile device provides both the resume failure log 134 and the configured MDT log 138 to the new serving base station.

Figure 2A:
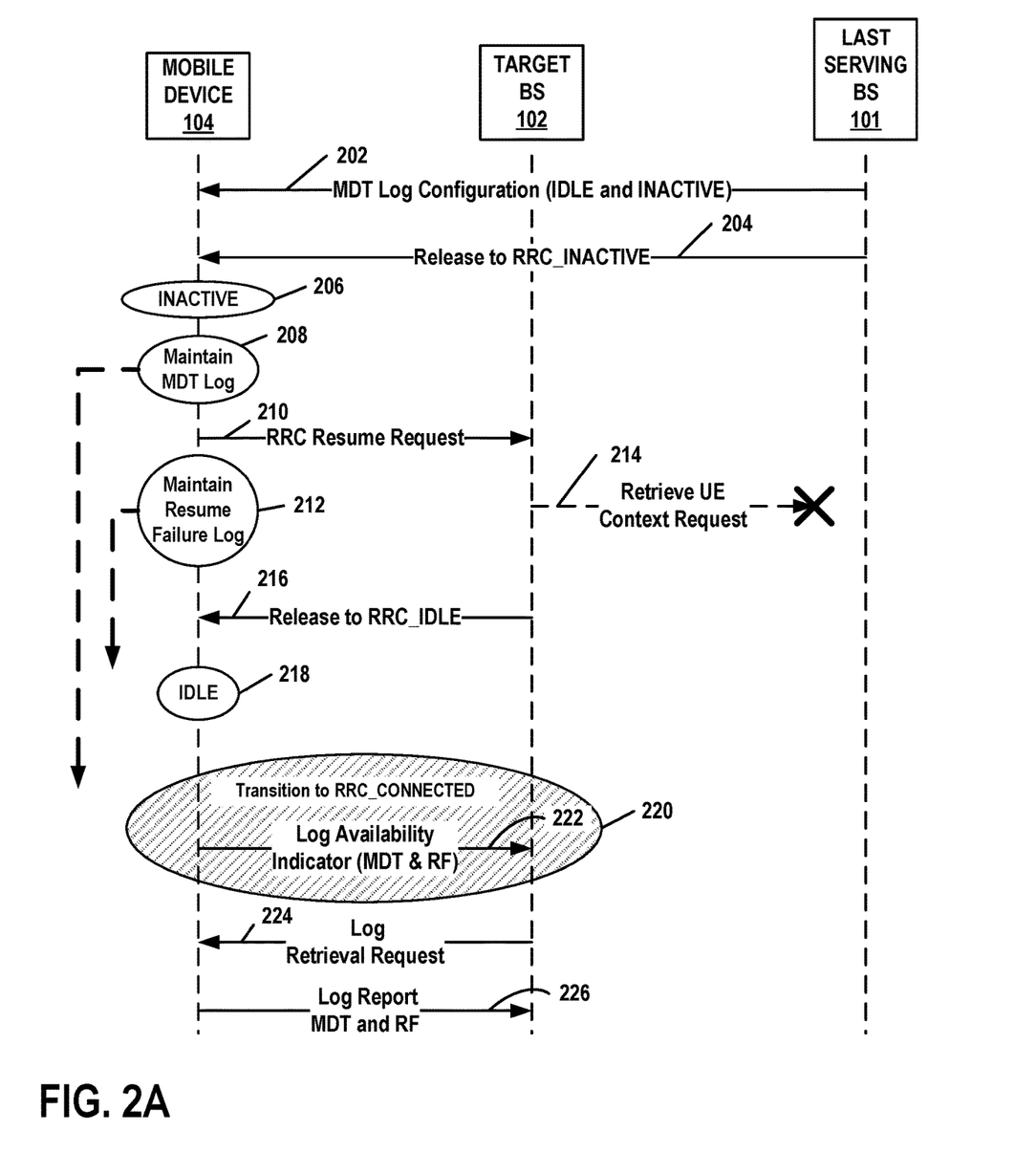
FIG. 2A is a messaging diagram of an example where the mobile device maintains a resume failure log and an MDT log for the inactive and idle states.

FIG. 2A is a messaging diagram of an example where the mobile device 104 maintains a resume failure log and an MDT log for the inactive and idle states.

At transmission 202, the last serving base station 101 sends MDT Log configuration information. For the example, MDT log configuration configures the mobile device for logging MDT during the inactive and idle states. In some situations, the logging procedure for both states is the same and the mobile device logs changes between states.

At transmission 204, the last serving base station 101 transitions the mobile device to inactive by sending a Release to RRC_INACTIVE message.

At event 206, the mobile device 104 is in the INACTIVE state. While in the Inactive state, the mobile device maintains the MDT log at event 208. The mobile device continues to maintain the MDT log for the inactive state in accordance with MDT log configuration while in the inactive state.

At transmission 210, the mobile device attempts to resume to the RRC_CONNECTED state by sending an RRC Resume Request to the target base station 102. For the example, the mobile device 104 maintains a resume failure log at event 212 that includes information regarding the RRC Resume Request and the results of the request. Accordingly, the mobile device may log the time of the RRC Resume Request and messages received (or non-receipt of messages) from the target base station 102. In addition, the mobile device maintains the MDT log and monitors radio link failures. As discussed above, the resume failure log may include any combination of parameters and information. Although not shown in FIG. 2A, the mobile device may receive information related to reasons for a failed resume attempt from the target base station 102 such as capacity and QoS constraints at the target base station 102.

At transmission 214, the target base station 102 attempts to retrieve mobile device information from the last serving base station 101. For the example, the target base station 102 sends a Retrieve UE Context Request to the last serving base station 101. The Request, however, is not received by the last serving base station 102. As a result, the RRC Resume fails. Therefore, for the example of FIG. 2A, the resume failure is due to the inability of the target base station to retrieve the UE context. As discussed above, the resume failure may be due to other causes in other situations.

At transmission 216, the target base station 102 sends a Release to RRC IDLE message i.e., RRCRelease message to the mobile device 104. As a result of the inability to retrieve the UE context, the target base station transitions the mobile device 104 to RRC IDLE. The mobile device 104 transitions to idle at event 218. In other cases, the target base station 102 may send an RRCResume message at transmission 216 to the mobile device 104, but if the mobile device 104 is unable to comply with any part of the configuration included in the RRCResume message, the mobile device will go to RRC IDLE. The mobile device logs the transition to idle and the receipt of the Release to IDLE message in the resume failure log.

At event 220, the mobile device transitions to RRC_CONNECTED from IDLE. In accordance with known techniques, the mobile device establishes the RRC_CONNECTED with the target base station 102. As part of the transition, the mobile device transmits, at transmission 222, a Log Availability Indicator as part of the RR CConnection establishment procedure. For the example, the Log Availability Indicator indicates the availability of the MDT log and the resume failure log. However, in some case the Log availability indicator only indicates one of the two logs and the other log may be indicated during a handover to another cell or during a future RRC Connection Establishment or Re-establishment.

At transmission 224, the target base station 102 sends a Log Retrieval Request. For the example, the request is for the resume failure log and the MDT log. In some situations, only one of the logs may be requested.

At transmission 226, the mobile device sends the MDT and resume failure reports to the target base station. In some situations, only one of the logs may be transmitted. The log reports include the MDT for inactive and idle as well as the resume failure log and indication of the timing of state changes. As a result, the network receives information regarding MDT during the different states and information regarding the resume failures. The information may be evaluated together to determine the reasons for RRC resume failed attempts as well as other conditions in the wireless network.

Figure 2B:
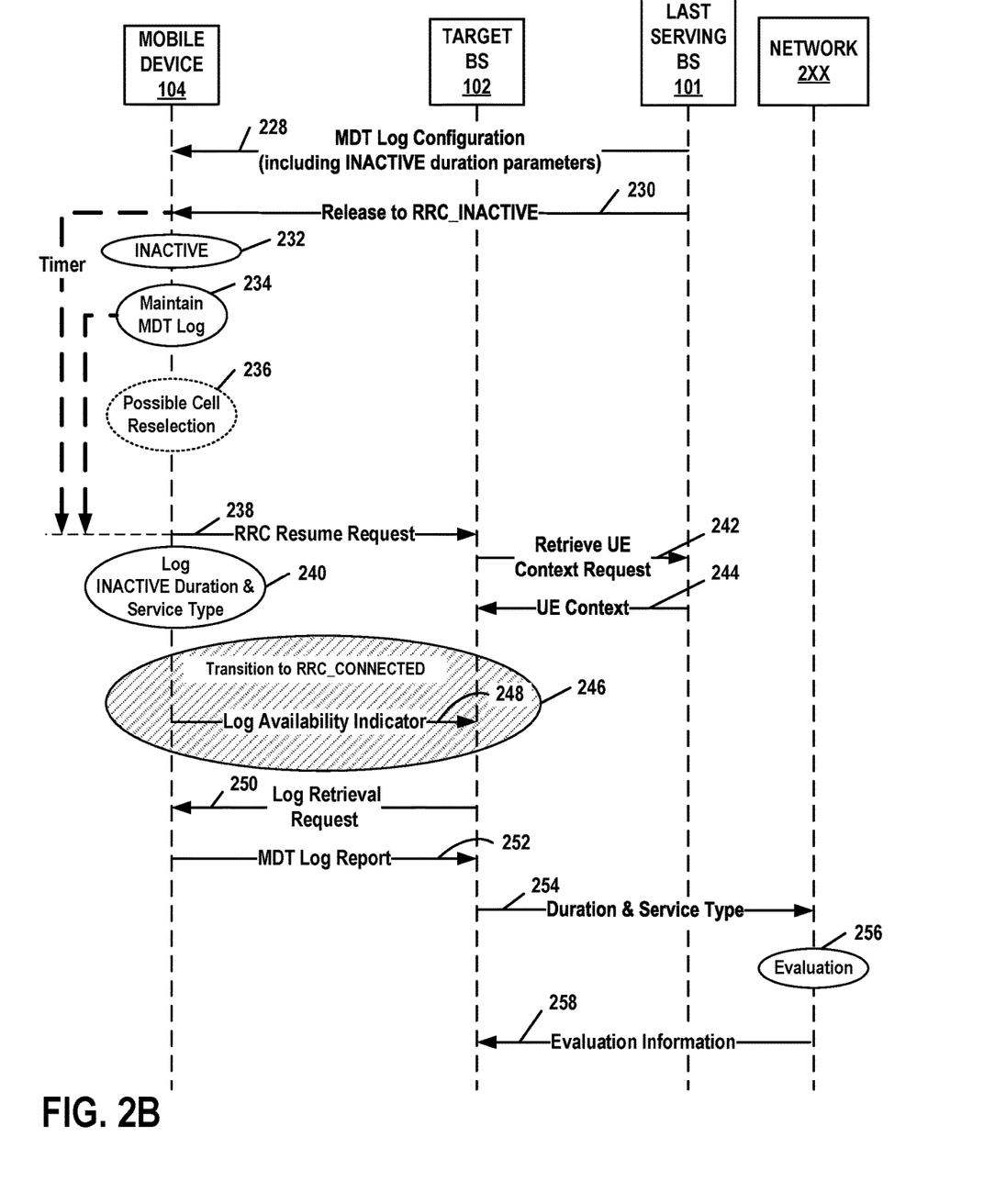
FIG. 2B is a messaging diagram of an example where the mobile device 104 maintains an MDT log for the inactive state that includes an inactive duration and service type

FIG. 2B is a messaging diagram of an example where the mobile device 104 maintains an MDT log for the inactive state that includes an inactive duration and service type. For the example, the MDT log also includes MDT data, state change information and reselected cell criteria. As discussed above, the mobile device maintains the MDT log for the idle and inactive states while maintaining a resume failure log in at least some situations. For the example of FIG. 2B, however, the MDT log is maintained in the inactive state and messages and events related to the resume failure log and idle state are omitted. Accordingly, the messages and events of the example of FIG. 2B may or may not be performed in conjunction with a resume failure log procedure.

At transmission 228, the last serving base station 101 sends MDT Log configuration information. For the example, MDT log configuration configures the mobile device for logging MDT during at least the inactive state and includes configuration for the inactive duration measurements. In some cases, the inactive duration may be derived from the time stamps from the periodical loggings. The time duration in RRC_INACTIVE can be calculated based on the difference between the last time stamp before resume procedure and the initial time stamp in the first log after the mobile device transitions to RRC_INACTIVE. In some situations, as discussed above, the logging procedure for both states is the same and the mobile device logs changes between states.

At transmission 230, the last serving base station 101 transitions the mobile device to inactive by sending a Release to RRC_INACTIVE message.

At event 232, the mobile device 104 is in the INACTIVE state. While in the inactive state, the mobile device maintains the MDT log at event 234. The receipt of the Release to RRC_Inactive message triggers a timer for maintaining the inactive duration log parameters. The mobile device continues to maintain the MDT log for the inactive state in accordance with MDT log configuration while in the inactive state.

At event 236, the mobile device may reselect different cells. The mobile device may reselect cells several times depending on the particular circumstances. In some situations, however the mobile device may remain camped on the last serving base station 101. In such situations, the RRC resume request is sent to the last serving base station 102 and the transmissions 242 and 244 are not needed.

At transmission 238, the mobile device attempts to resume to the RRC_CONNECTED state by sending an RRC Resume Request to the target base station 102. The mobile device determines the elapsed time from the receipt of the Release to RRC_Inactive message to the transmission of the RRC Resume Request and logs the value as the inactive duration at event 240. The mobile device also logs the service type at event 240. For 5G the service type is based on QoS Indicator which is used in 3GPP to identify a specific QoS forwarding behavior for a 5G QoS Flow (similar to the QCI value used for LTE). As such, it defines packet error rate, packet delay budget, resource type (GBR or guaranteed bit rate), priority level, maximum data burst volume, etc. Standardized or pre-configured 5G QoS characteristics, are indicated through the 5QI value. Typically, 5QI values are pre-configured in the gNB. The 5G QoS characteristics for QoS Flows with dynamically assigned 5QI are signaled as part of the QoS profile and for the Logged MDT the 5QI value(s) may be logged.

At transmission 242, the target base station 102 sends a Retrieve UE Context Request to the last serving base station 101. The last serving base station 101 sends the UE context to the target base station 102 at event 244. In some cases, even if the mobile device transitions from INACTIVE to IDLE, the mobile device will maintain the inactive duration and the mobile device will still have the opportunity to report the log to the network after being connected.

At event 246, the mobile device transitions to RRC_CO-NNECTED from RRC_INACTIVE. In accordance with known techniques, the mobile device establishes the RRC_CONNECTED with the target base station 102. As part of the transition, the mobile device transmits, at transmission 248, a Log Availability Indicator as part of the RRC Connection establishment procedure. For the example, the Log Availability Indicator indicates the availability of the MDT log.

At transmission 250, the target base station 102 sends a Log Retrieval Request. For the example, the request is for the MDT log.

At transmission 252, the mobile device sends the MDT log report to the target base station. For the example, the MDT log report includes the MDT for inactive and idle as well as an indication of the timing of state changes. As a result, the network receives information regarding MDT during the different states. The MDT log report includes the inactive duration and the service type information in addition to the other MDT log data. In situations where the MDT log is not retrieved by the target base station and the mobile device is released to RRC_INACTIVE again, the mobile device resets the inactive duration timer for the examples herein.

At transmission 254, the target base station delivers the inactive duration and service type. For the examples herein, the inactive duration and service type are included in the Logged MDT, sent to the network (or OAM) as part of the TRACE procedure. The information is evaluated for post-processing to determine the average time it takes for the mobile device to remain in RRC_INACTIVE before resuming to RRC_CONNECTED. This allows the network to decide whether the base station (gNB) should release a mobile device (UE) to RRC_INACTIVE or RRC_IDLE. Depending on the resources available in the base station (gNB) to retain all the UE contexts of the mobile devices while the mobile devices are in RRC_INACTIVE, the network determines the maximum time that the mobile device should resume connection before the base station (gNB) releases a mobile device (UE) to RRC_INACTIVE. Otherwise, the base station (gNB) releases the mobile device to RRC_IDLE. The network will also need to take into account of the type of service since the service latency in the resume procedure is much less than if the mobile device were to restart the service from RRC_IDLE.

At transmission 258, the network (OAM) provides the result of the post-processing from multiple mobile devices to the target base station. The information assists the target base station in determining the trigger conditions that the base station should use to decide between releasing the mobile device to RRC_IDLE or RRC_INACTIVE.

Figure 3A:
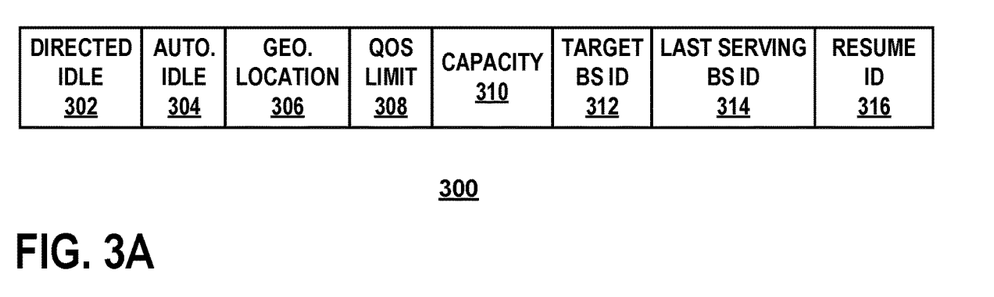
FIG. 3A is a block diagram of an example of a resume failure log.

FIG. 3A is block diagram of an example of a resume failure log 300. The resume failure log 300 of FIG. 3, therefore, is an example of the resume failure log 134 discussed above.

For the example, the resume failure log 300 includes a directed idle indicator 302, an autonomous idle indicator 304, geographical location indicator 306, QoS limited indicator 308, capacity indicator 310, target cell identifier 312, last serving cell identifier 314, and Resume ID 316. Some indicators and/or identifiers may be omitted in some situations. Additional parameters may also be included. The directed idle indicator 302 at least indicated that a Release to IDLE message was received from the target base station. The directed idle indicator 302 may also include a time stamp of the receipt of the message. The autonomous idle indicator 304 at least indicates that the mobile device autonomously transitioned to IDLE. The autonomous idle indicator 304 may also indicate other circumstances around the autonomous transition to IDLE such as an indicator that no response was received from the target after transmission of the RRC resume request was sent. Other information may include the number of failed random access attempts and the radio measurements at the time of failure. The geographical location indicator 306 indicates the geographical location of the mobile device when sending the RRC Resume Request and/or when resume failure was identified (e.g., receipt of Release to IDLE, autonomous transition to IDLE). Although any parameter indicating geographical location can be used, an example of a suitable parameter includes GPS coordinates. The QoS limited indicator 308 indicates that the target base station 102 transitioned the mobile device 104 to IDLE because the target could not provide the QoS required for the service being used by the mobile device. In order to have the capability to log QoS limited indicator 308, in the example, the mobile device 104 receives the information from the target base station indicating the QoS limit when receiving the Release to IDLE message. The capacity indicator 310 indicates that the target base station 102 transitioned the mobile device 104 to IDLE because the target base station could not provide service to the mobile device due to limited capacity at the target base station cell. In order to have the capability to log the limited capacity indicator 310, in the example, the mobile device 104 receives the information from the target base station indicating that the capacity limit was the cause of the Release to IDLE when receiving the Release to IDLE message. In at least some examples, therefore, the target base station sends connect state denial information to the mobile device where the connect state denial information indicates a reason for the target base station denying establishment of the connection state. For the examples herein, the connect state denial information is sent as part of the RRCRelease, RRCReject or RRCResume messages. The connect state denial information is then logged in the resume failure log and may include information related to limited capacity and limited ability to provide the required QoS.

The target cell identifier 312 identifies the target base station that was sent the RRC Resume Request. The last serving cell identifier 314 identifies the last serving base station before the mobile device entered the inactive state. In some situations, a Resume ID 316 is also included in the resume failure report as the Resume ID is sent in the RRC Resume Request message to inform the target base station regarding the identity of the mobile device 104 that wishes to establish connection. The Resume ID is configured by the last serving base station. When the mobile device sends a resume request to the target base station, the resume ID can be used as part of the context fetch to identity the mobile device.

Figure 3B:
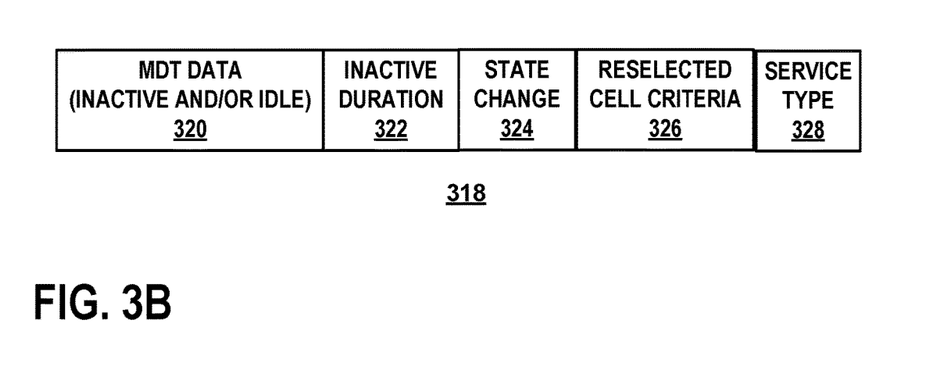
FIG. 3B is a block diagram of an example of an MDT log with an inactive duration indicator.

FIG. 3B is a block diagram of an MDT log report 318 that includes MDT data 320 and an inactive duration indicator 322. For the example, the MDT data may include both MDT data logged during RRC_IDLE and during RRC_INACTIVE. The data includes signal strength information and other parameters typically logged during MDT. The inactive duration indicator 322 indicates the duration of time the mobile device was in the inactive state before attempting to resume to the RRC_CONNECTED state. Therefore, as part of the MDT logging, the mobile device establishes a timer from the time the Release to Inactive message is received and logs the time elapsed until the mobile device attempts a resume to connect with the transmission of a RRC Resume Request. For the examples herein, the MDT log also includes a state change indicator 324 that indicates when the mobile device changes between IDLE and INACTIVE. This information assists the network in determining which MDT data was logged during the different mobile device states.

The MDT log also includes a reselected cell criteria 326 that indicates how the mobile device reselected a cell. For the Logged MDT, the mobile device logs the measurement quantities for downlink pilot strength measurement consisting of both RSRP and RSRQ. In some situations, the mobile device does not choose the highest ranked cell for camping. For example, If rangeToBestCell is configured, then the mobile device shall perform cell reselection to the cell with the highest number of beams above the threshold (i.e. absThreshSS-BlocksConsolidation) among the cells whose R value is within rangeToBestCell of the R value of the highest ranked cell and not the highest ranked cell. In other situations, if the absolute priority is configured for frequency F1, the mobile device reselects a cell on F1, even if the cell on F2 provides the best RSRP. In the case when the serving cell fulfils Squal>ThreshServing, LowQ, the mobile device stays on the serving cell, even if a cell on a lower priority cell provides the best cell. For supporting NR shared spectrum channel access operation for cell selection/reselection, the mobile device may camp on a non-best cell if the best cell does not belong to the registered PLMN (or E-PLMN), where the non-best cell would still be the best cell of the registered PLMN. For the examples herein, the reselected cell criteria 326 identifies on of a plurality of reasons for selecting the cell where the plurality of reasons includes at least the cases discussed above.

Service type 328 is based on the QoS Indicator which is used in 3GPP to identify a specific QoS forwarding behavior for a 5G QoS Flow (similar to the QCI value used for LTE).

Figure 4:
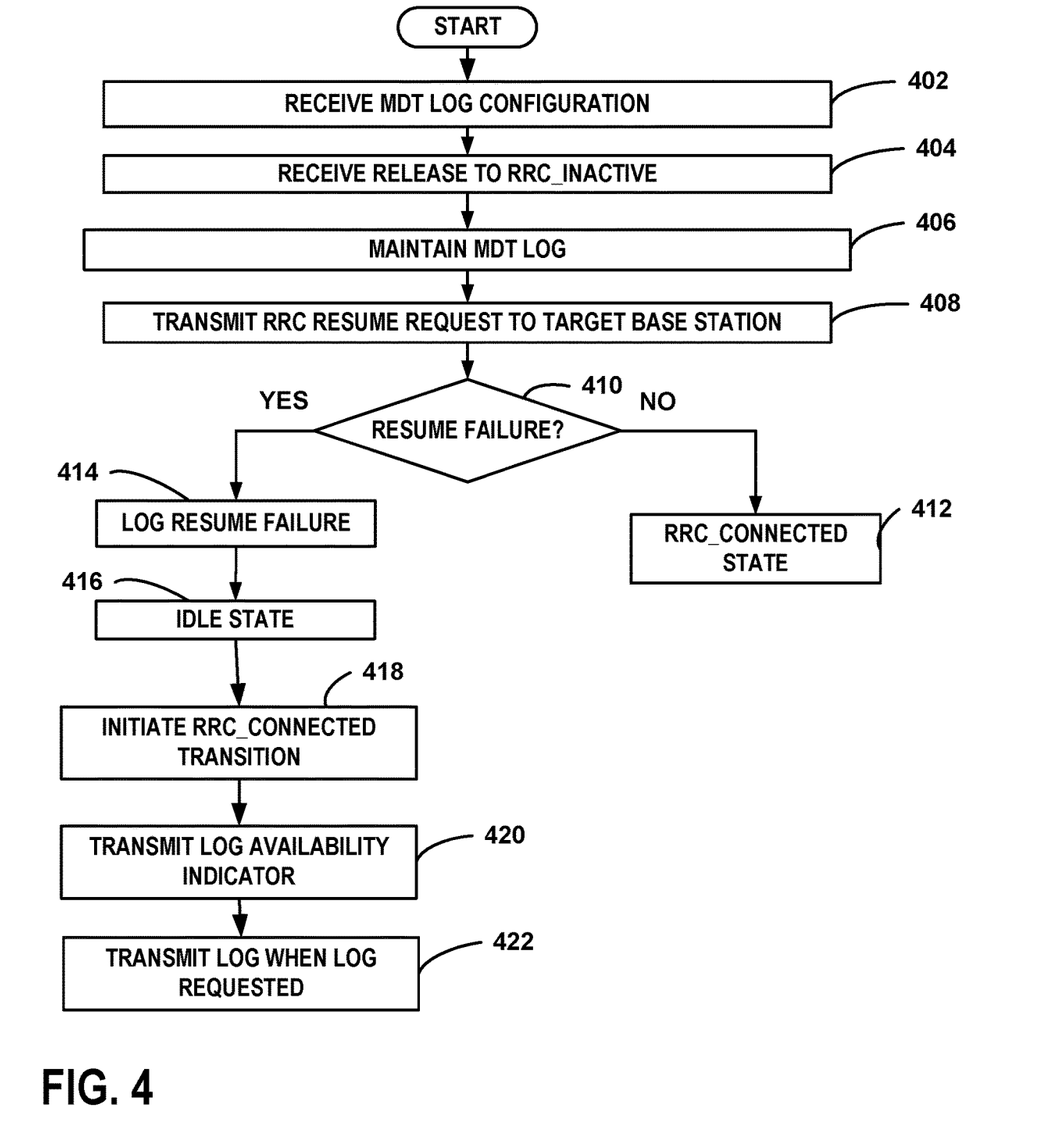
FIG. 4 is a flow chart of an example of a method for logging resume failures at a mobile device.

FIG. 4 is a flow chart of an example of a method for logging resume failures at a mobile device. Accordingly, the method can be performed by a device such the mobile device 104 discussed above including UE devices, handsets, wireless modems and other user equipment.

At step 402, an MDT log configuration is received. The mobile device receives a message or messages information that configures the mobile device to perform MDT logging including the MDT logging during the inactive state and during the IDLE state.

At step 404, a Release to RRC_INACTIVE is received. The mobile device receives a message with the Release to RRC_INACTIVE information from the last serving base station. The mobile device enters the INACTIVE state after receiving the message.

At step 406, the MDT log is maintained in accordance with the MDT log configuration. The mobile device measures signals transmitted from base stations in the area and records the results in accordance with MDT logging. For the examples herein, the mobile device also maintains a timer from when the Release to RRC_INACTIVE was received.

At step 408, a resume request is transmitted to the target base station. For the example, the mobile device transmits an RRC_Resume_Request in accordance with known techniques. Accordingly, the mobile device attempts to return to the CONNECTED state and sends the request. The mobile device also begins logging the specified parameters for the resume failure log. Accordingly, the mobile device may log the time the resume request was sent, the location of the mobile device, how long the mobile device has been in the inactive state, as well as other parameters. For the example, the mobile device determines elapsed on the timer started at the time the Release to RRC_INACTIVE was received and logs the inactive duration.

At step 410, it is determined whether the resume attempt failed. The mobile device determines whether a Release to IDLE message has been received. The mobile device may also determine whether the mobile device had entered the IDLE state autonomously because of, for example, a radio link failure or because no messages has been received from the target base station. If the resume request is successful, the method proceeds to step 412 where the mobile device enters the RRC_CONNECTED state. Otherwise, the method continues at 414.

At step 414, the mobile continues to log the failed resume attempt and records any remaining parameters or conditions required by the resume failure log. The mobile device then continues to the IDLE state at step 416.

At step 418, the transition to RRC_CONNECTED is initiated. Messages are exchanged with a base station which may be the previous target base station or another base station. As part of the transition to RRC_CONNECTED, the mobile device sends a log availability indicator to the base station at step 420. The log availability indicator notifies the base station of the log reports that are available. For the example, the log availability indicator indicates whether a resume failure report is ready as well as MDT reports.

At step 422, the mobile device receives a log retrieval request from the base station and provides the requested report(s). For the example, the MDT log includes data logged during the inactive and idle states and indicates when the mobile device has changed states.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A mobile wireless communication device comprising:
 a memory;
 a transmitter configured to transmit a resume request to a target base station while the mobile wireless communication device is in an inactive state, the resume request requesting establishment of a connected state, the inactive state comprising connection to a network in a connection management connected (CM_Connected) state without a capability of transmitting or receiving user data between the mobile wireless communication device and the network, the mobile wireless communication device considered to be in the CM_Connected state at least by the mobile wireless communication device and the network when the mobile wireless communication device is in the inactive state, the connected state comprising the capability to transmit and receive user data between the mobile wireless communication device and the network; and
 a controller configured to store a resume failure log in the memory, the resume failure log comprising failure log information associated with a failure to establish the connected state from the inactive state.

2. The mobile wireless communication device of claim 1, wherein the failure log information comprises a directed idle indicator indicating whether the base station instructed the mobile wireless communication device to enter an idle state where the mobile wireless communication device is not connected in the CM_connected state.

3. The mobile wireless communication device of claim 1, wherein the failure log information includes a geographical location of the mobile wireless communication device.

4. The mobile wireless communication device of claim 1, wherein the failure log information includes a resume ID identifying the mobile wireless communication device.

5. The mobile wireless communication device of claim 1, wherein the failure log information includes a target base station identifier uniquely identifying the target base station.

6. The mobile wireless communication device of claim 1, wherein the failure log information includes a last serving base station identifier uniquely identifying a last serving base station before the mobile wireless communication device entered the inactive state.

7. The mobile wireless communication device of claim 1, further comprising a receiver configured to receive connect state denial information from the target base station, the connect state denial information indicating a reason for the target base station denying establishment of the connection state, the controller further configured to store the connect state denial information in the resume failure log.

8. The mobile wireless communication device of claim 7, the connect state denial information including at least one of a quality of service (QoS) limit indicating the target base station could not provide the QoS required by the mobile wireless communication device in the connected state and a capacity limit indicating that the target base station did not have the capacity to provide service to the mobile wireless communication device.

9. The mobile wireless communication device of claim 1, wherein the inactive state and the connected state are defined by at least one revision of a 3rd Generation Partnership Project (3GPP) 5G New Radio (NR) specification as RRC_INACTIVE and RRC_CONNECTED, respectively.

10. A method performed at a mobile device, the method comprising:
 receiving, from a last serving base station connected to a network, a release to inactive message instructing the mobile device to enter an inactive state, the inactive state comprising a connection between the mobile device and an Access Management Function (AMF) of the network without a capability of transmitting or receiving user data between the mobile wireless communication device and the network, the mobile device considered to be in a connection management connected (CM_Connected) state at least by the mobile device and the network when the mobile device is in the inactive state;
 transmitting, to a target base station, resume request while the mobile device is in the inactive state, the resume request requesting establishment of a connected state, comprising the capability to transmit and receive user data between the mobile device and the network; and
 maintaining a resume failure log comprising failure log information associated with a failure to establish the connected state from the inactive state.

11. The method of claim 10, wherein the failure log information comprises a directed idle indicator indicating whether the base station instructed the mobile device to enter an idle state where the mobile device is not connected to the AMF.

12. The method of claim 10, wherein the failure log information includes a geographical location of the mobile device.

13. The method of claim 10, wherein the failure log information comprises a Resume ID identifying the mobile device.

14. The method of claim 10, wherein the failure log information includes a target base station identifier uniquely identifying the target base station.

15. The method of claim 10, wherein the failure log information includes a last serving base station identifier uniquely identifying the last serving base station.

16. The method of claim 10, further comprising:
 receiving connect state denial information from the target base station, the connect state denial information indicating a reason for the target base station denying establishment of the connection state; and
 storing the connect state denial information in the resume failure log.

17. The method of claim 16, the connect state denial information including at least one of a quality of service (QoS) limit indicating the target base station could not provide the QoS required by the mobile device in the connected state and a capacity limit indicating that the target base station did not have the capacity to provide service to the mobile device.

18. The method of claim 10, wherein the inactive state and the connected state are defined by at least one revision of a 3rd Generation Partnership Project (3GPP) 5G New Radio (NR) specification as RRC_INACTIVE and RRC_CONNECTED, respectively.

* * * * *